United States Patent [19]

Spencer et al.

[11] Patent Number: 5,301,810
[45] Date of Patent: Apr. 12, 1994

[54] METHOD AND APPARATUS FOR REMOVING PLASTIC FROM WOOD CHIPS

[76] Inventors: Ronald V. Spencer, Box 194, Gold River, British Columbia, Canada, V0P 1 G0;

[21] Appl. No.: 954,170
[22] Filed: Sep. 29, 1992
[51] Int. Cl.⁵ .............................. B07B 13/00
[52] U.S. Cl. ........................ 209/11; 209/45; 209/485; 209/498
[58] Field of Search .............. 209/3, 3.1, 44, 45, 209/46, 488, 492, 11, 498, 485

[56] References Cited

U.S. PATENT DOCUMENTS

| | | | |
|---|---|---|---|
| 581,908 | 5/1897 | Gent et al. | 209/45 X |
| 3,006,465 | 10/1961 | James | 209/45 |
| 3,070,318 | 12/1962 | Blanchard | 209/45 X |
| 3,472,379 | 10/1969 | Lainas et al. | 209/44 X |
| 3,587,851 | 6/1971 | Anderson | 209/45 X |
| 3,599,788 | 8/1971 | Fyfe | 209/46 X |
| 4,532,030 | 7/1985 | Avedian et al. | 209/45 |

Primary Examiner—D. Glenn Dayoan
Assistant Examiner—Tuan N. Nguyen
Attorney, Agent, or Firm—Beehler & Pavitt

[57] ABSTRACT

Apparatus and process for removing unwanted foreign material from particulate material. The apparatus and process find particular application in the pulp and paper industry to remove contaminating plastic material from wood chips. The apparatus includes a transporting conveyor for moving the particulate material between an inlet area and an outlet area and a vibrating motor for vibrating the conveyor to sort the particulate material and the foreign material. Heated rollers heated to a temperature sufficient to render the foreign material tacky are applied to the sorted material and cause the foreign material to adhere thereto such that the foreign material is extracted from the particulate material which is delivered to the outlet area.

14 Claims, 1 Drawing Sheet

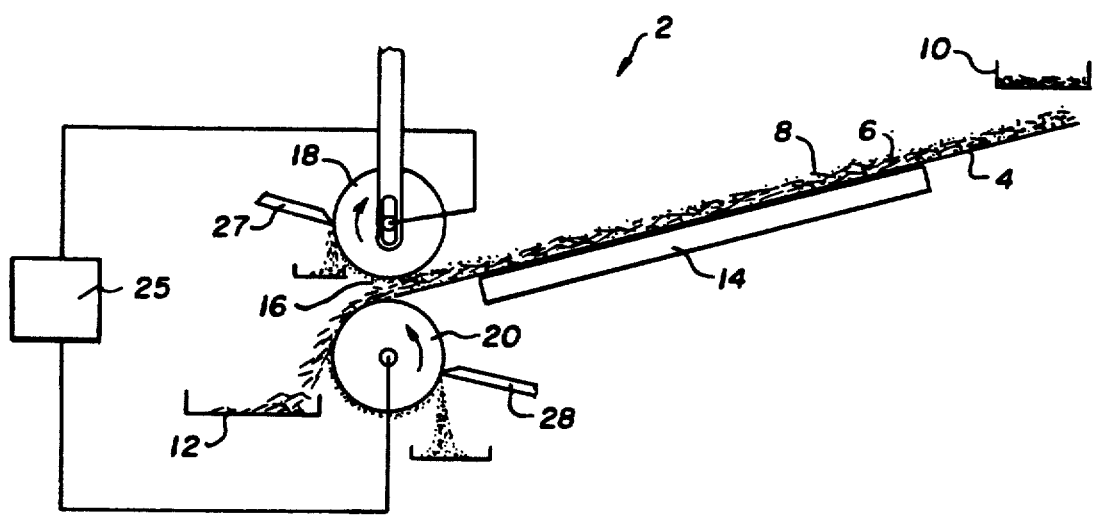

METHOD AND APPARATUS FOR REMOVING PLASTIC FROM WOOD CHIPS

FIELD OF THE INVENTION

This invention relates to an apparatus and method for separating materials and, in particular is directed to an apparatus and method for separating contaminating plastic from wood chips.

BACKGROUND OF THE INVENTION

In the pulp and paper industry, logs provide the raw material for the manufacture of paper and paper products. These logs are processed in large mills and the first step in handling of the logs often involves converting them into wood chips which are a convenient form for further processing.

The raw logs that are delivered to a mill often include pieces of waste plastic that are unfortunately becoming a common part of the environment. Plastic is used in a great deal of packaging and often ends up discarded into the environment. Unfortunately, when the logs are converted into wood chips, the plastic tends to be converted into smaller pieces as well. In the conversion of the wood chips into pulp and paper, the plastic pieces can contaminate the resulting paper product leading to reduced quality paper or paper that is unsuitable for use at all. Spoilage of new paper by plastic contamination can be a costly problem in the industry where a large batch of paper can be ruined or reduced in quality by a relatively small amount of unwanted plastic. Presently, to address this problem, mills simply rely on workers handling logs and wood chips to visually inspect the material and remove visible pieces of plastic. Obviously, this method is very inefficient and does not remove all plastic waste.

SUMMARY OF THE INVENTION

Accordingly, there is a need for an apparatus and method for reliably and efficiently removing contaminating plastic from the wood to be processed into paper. This is best accomplished by removing the plastic after the logs have been converted into wood chips.

The present invention provides apparatus for removing unwanted foreign material from particulate material comprising:

transporting means for moving the particulate material between a inlet area and an outlet area;

means for vibrating the transporting means to sort the particulate material and the foreign material; and means for extracting the sorted foreign material from the particulate material.

The present invention also provides a method for removing foreign material from particulate material comprising:

transporting the particulate material between an inlet area and an outlet area on a transporting surface;

vibrating the transporting surface to sort the particulate material and the foreign material; and extracting the sorted foreign material from the particulate material.

In a preferred embodiment, the apparatus and method of the present invention is used to separate foreign material in the for of plastic from particulate material is the form of wood chips for use in pulp and paper production.

BRIEF DESCRIPTION OF THE DRAWINGS

Aspects of the present invention are illustrated, merely by way of example, in the accompanying Figure which shows a schematic view of the apparatus of the present invention.

DESCRIPTION OF THE PREFERRED EMBODIMENTS

Referring to the single Figure, there is shown a preferred embodiment of an apparatus 2 according to the present invention for removing unwanted foreign material from particulate material. The apparatus 2 is shown schematically and includes transporting means in the form of an inclined conveyor 4 for moving particulate material such as wood chips 6 and contaminating plastic pieces 8 between an inlet area 10 and an outlet area 12. Inlet area 10 is a conveyor belt that brings wood chips directly from wood chipping equipment. The chipping equipment will also tend to have converted any contaminating plastic into plastic particles. Outlet area 12 is a second conveyor that takes separated wood chips uncontaminated by plastic particles on to further processing.

Contaminated wood chips are fed onto inclined conveyor 4 in a continuous stream and conveyor 4 is operated at a speed such that the chips cover the conveyor to a substantially uniform depth. Inclined conveyor 4 is vibrated in a known manner by motor 14 to sort the wood chips and the particulate plastic. The wood chips and plastic particles will tend to have different densities such that lighter plastic particles will tend to move to the top of the wood chips and heavier plastic particles will move to the bottom of the wood chips. Therefore, the particulate material on conveyor 4 is sorted into substantially three layers: an upper layer of lower density plastic particles, a middle layer of wood chips and a lower layer of higher density plastic particles. Of course, the middle layer of wood chips will comprise the majority of material on conveyor 4.

At the discharge end 16 of conveyor 4 means for extracting the sorted plastic particles from the wood chips are provided in the form of at least one rotatable heatable surface adjacent outlet area 16. In the illustrated embodiment, the at least one rotatable heatable surface comprises a pair of rollers 18 and 20 positioned above and below conveyor 4 and spaced apart to permit passage of the wood chips therebetween while still contacting the wood chips. In this regard, upper roller 18 is shown mounted for vertical movement to accommodate any transient changes in the depth of wood chips passing between the rollers. It will be apparent that lower roller 20 or both rollers can be mounted for vertical movement. In addition, the rollers can be biased toward each other slightly to maintain contact with the wood chips and otherwise free to "float" over the chips. Alternatively, the position of the rollers can be positively controlled by hydraulic means (not shown) to create a desired spacing.

Rollers 18 and 20 are heatable to a temperature sufficient to render the plastic particles the rollers contact tacky such that the plastic particles adhere to the roller surface and are effectively extracted from the wood chips. Rollers 18 and 20 are driven by motor 25 to rotate at a speed corresponding to the speed of the wood chips leaving conveyor 4. Roller 18 is positioned to extract the upper layer of lower density plastic particles while roller 20 is positioned to extract the lower layer of higher density plastic particles.

Rollers 18 and 20 are variably heatable to a desired temperature that depends on the plastic particles to be rendered tacky. It is common for the melting temperature of a particular plastic to be used as an identifying characteristic, hence the temperature for rendering a wide range of types of plastics tacky are well known. These temperatures are sufficiently low and the wood chips pass between the rollers at a sufficient speed that the heated rollers do not affect the wood chips which are delivered to outlet area 12 for automatic transport to further processing equipment.

To prevent build up of extracted plastic particles on the rollers, doctoring means in the form of knives 27 and 28 are provided for scraping plastic particles from the rollers.

While the present invention has been described with a pair of heated rollers, it will be understood that a single heated roller can be used above or below conveyor 4 depending on the density of plastic particles to be extracted.

In operation, the apparatus of the present invention can be integrated into the processing line of a mill between the wood chipping process and further handling and processing of the produced wood chips. The apparatus is capable of handling the large volumes of wood chips created in a mill. It is expected that a single worker will be necessary to oversee the operation of the equipment to adjust roll position and temperature as appropriate.

Although the present invention has been described in some detail by way of example for purposes of clarity and understanding, it will be apparent that certain changes and modifications may be practised within the scope of the appended claims.

I claim:

1. Apparatus for removing thermoplastic material from particulate material comprising:
    transporting means for moving the particulate material and unwanted thermoplastic material in a material stream between a inlet area and an outlet area;
    means for vibrating the particulate material and the thermoplastic material while on the transporting means to sort the particulate material and the thermoplastic material into layers according to density;
    rotatable heatable surfaces spaced apart and positioned above and below the material stream as the stream leaves the transporting means for the outlet area for contacting the material stream, the surfaces being heatable to a temperature sufficient to render the thermoplastic material tacky such that the material adheres to the heatable surfaces and is extracted from the material stream; and
    means for removing the thermoplastic material from the rotatable heatable surfaces.

2. Apparatus as claimed in claim 1 in which the transporting means comprises an inclined conveyor.

3. Apparatus as claimed in claim 2 in which the vibrating means comprises a motor to vibrate the inclined conveyor.

4. Apparatus as claimed in claim 1 in which the rotatable heatable surfaces comprise upper and lower rollers.

5. Apparatus as claimed in claim 1 in which the rotatable heatable surfaces are biased toward each other to maintain contact with the material stream passing therebetween and otherwise free to move with the material stream.

6. Apparatus as claimed in claim 1 in which the rotatable heatable surfaces are positioned with respect to each other by hydraulic means.

7. Apparatus as claimed in claim 1 in which the rotatable heatable surfaces are driven to rotate at a speed corresponding to the speed of the material stream as it leaves the transporting means.

8. Apparatus as claimed in claim 1 in which the rotatable heatable surfaces are mounted for vertical movement.

9. Apparatus as claimed in claim 1 in which the rotatable heatable surfaces are variably heatable to a desired temperature depending on the thermoplastic material to be rendered tacky.

10. Apparatus as claimed in claim 1 in which the means for removing thermoplastic material from the movable surface includes doctoring means.

11. Apparatus as claimed in claim 1 in which the particulate material is wood chips.

12. Method for removing thermoplastic material from particulate material comprising:
    transporting the particulate material and thermoplastic material between an inlet area and an outlet area in a material stream on a transporting surface;
    vibrating the material stream to sort the particulate material and the thermoplastic material into stratified layers according to density;
    extracting the thermoplastic material layer from the particulate material by contacting the material stream with rotatable heatable surfaces positioned above and below the material stream adjacent the outlet area that render the thermoplastic material tacky such that the thermoplastic material adheres to the rotatable heatable surfaces and is removed for the material stream; and
    removing the thermoplastic material from the rotatable heatable surfaces.

13. Method as claimed in claim 12 in which the particulate material is wood chips.

14. Method as claimed in claim 12 in which the rotatable heatable surfaces can be heated to a desired temperature depending on the thermoplastic material to be rendered tacky.

* * * * *